V. V. TORBENSEN.
MOTOR VEHICLE.
APPLICATION FILED NOV. 28, 1911.
1,032,517.
Patented July 16, 1912.
3 SHEETS—SHEET 1.
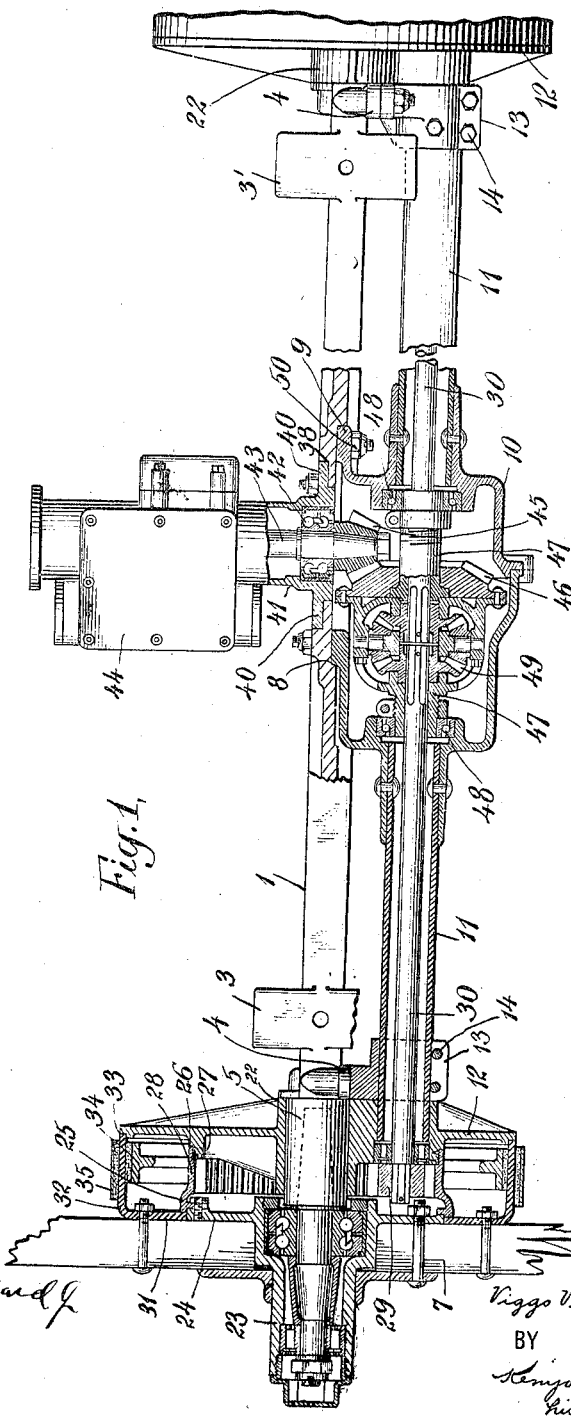
WITNESSES:
INVENTOR,
Viggo V. Torbensen,
BY
Kenyon & Kenyon
his ATTORNEYS.

V. V. TORBENSEN.
MOTOR VEHICLE.
APPLICATION FILED NOV. 28, 1911.
1,032,517.
Patented July 16, 1912.
3 SHEETS—SHEET 2.
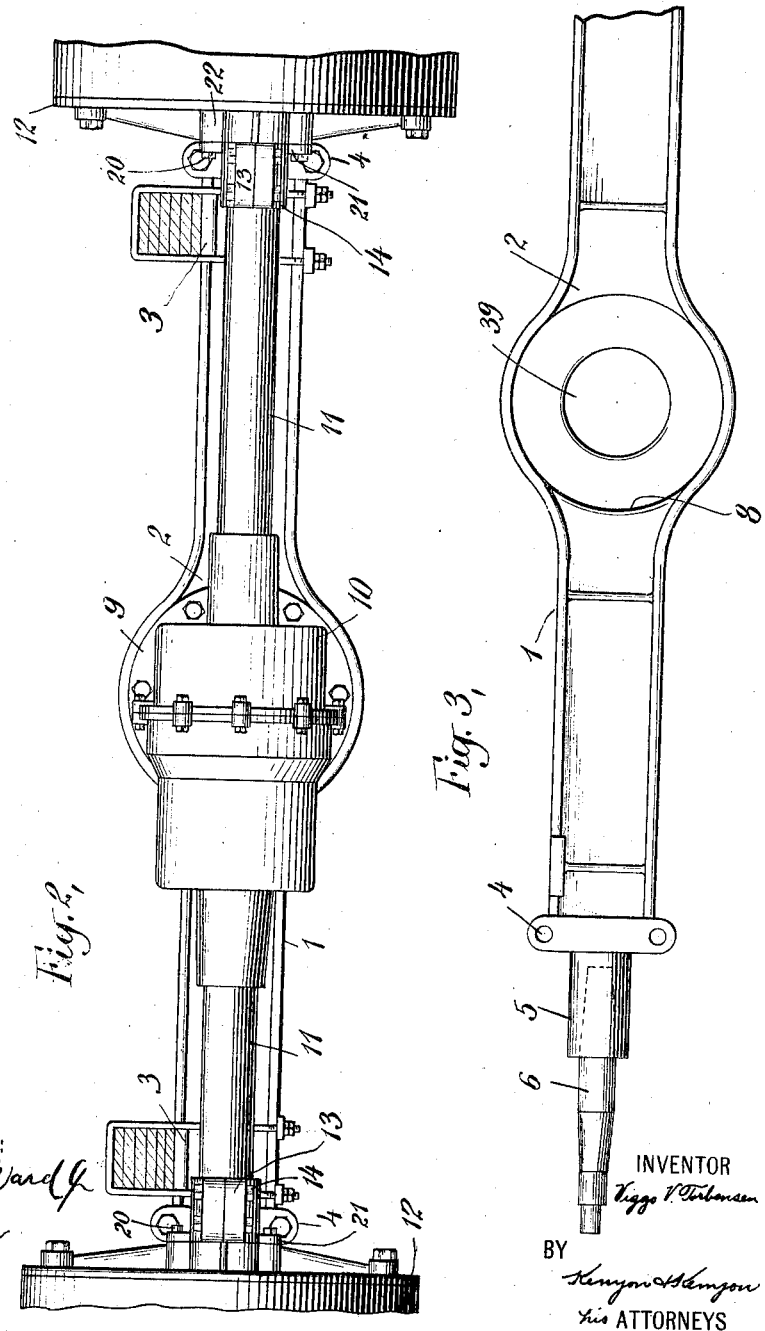

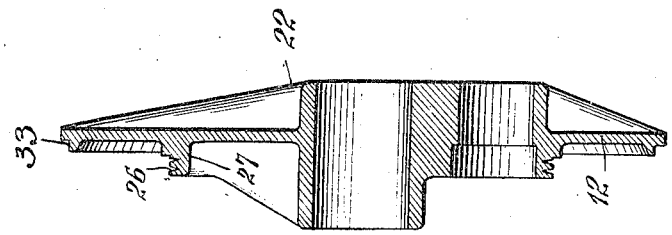
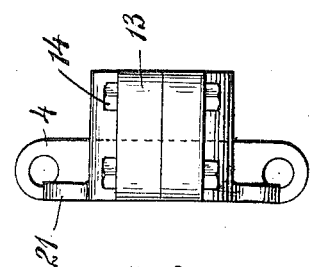
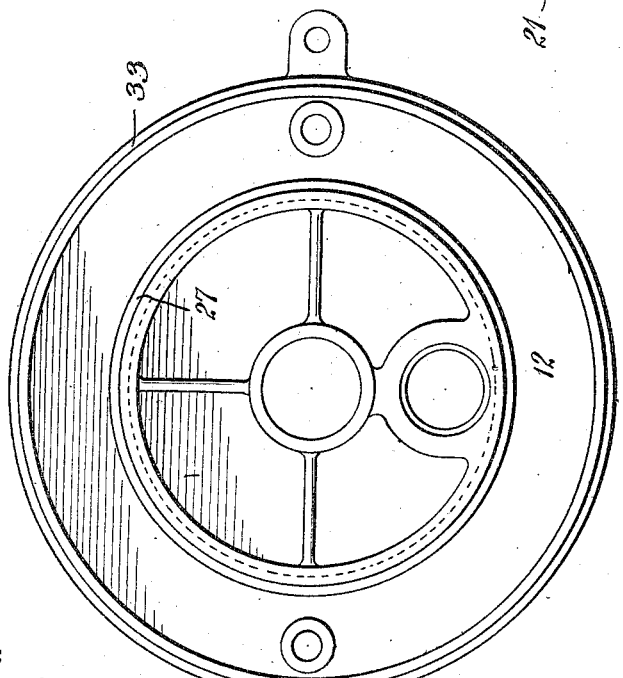

UNITED STATES PATENT OFFICE.

VIGGO V. TORBENSEN, OF BLOOMFIELD, NEW JERSEY, ASSIGNOR, BY MESNE ASSIGNMENTS, TO TORBENSEN GEAR AND AXLE COMPANY, OF BLOOMFIELD, NEW JERSEY, A CORPORATION OF NEW JERSEY.

MOTOR-VEHICLE.

1,032,517.    Specification of Letters Patent.    Patented July 16, 1912.

Application filed November 28, 1911. Serial No. 662,900.

*To all whom it may concern:*

Be it known that I, VIGGO V. TORBENSEN, a citizen of the United States, and a resident of Bloomfield, in the county of Essex and State of New Jersey, have invented certain new and useful Improvements in Motor-Vehicles, of which the following is a specification.

My invention relates to motor vehicles and more particularly to an axle therefor, and the construction and arrangement of transmission gear casings and the manner of securing the same to the axle.

One of the objects of my invention is to provide a simple axle of maximum strength and efficiency for the amount of material employed.

Another object of my invention is to so construct and arrange the axle and the casing for the differential gearing that a simple and stanch construction is attained—one by which, in the preferred form of my invention, the transmission shafts may be readily alined and the casing made to constitute a component part of the axle.

Another object of the invention is to so arrange and construct all of the casings inclosing the transmission gearing between the propeller shaft and the tread wheels that the gears may be thoroughly protected from grit or dirt.

My invention is especially useful for motor trucks where the parts are heavy and in the assembling of which difficulties are experienced in alining and in maintaining the alinement of the driving shafts and in preventing grit and dirt from getting into the gears adjacent the tread wheels.

The invention will be more readily understood and the objects of the invention will more fully appear from the following description taken in connection with the accompanying drawings forming a part of this specification, and in which—

Figure 1 shows, in part, a longitudinal sectional view of a motor truck axle equipped with transmission gearing and gear casings and embodying the preferred form of my invention; Fig. 2 shows a rear elevation of the same, with certain parts broken away; Fig. 3 shows a view of a portion of the preferred form of axle itself; Fig. 4 is a plan view of a plate mounted on the outer end of the axle adjacent the tread wheel to form, with flanges on the wheel, a gear casing; Fig. 5 is a cross sectional view of the same; and Fig. 6 shows a clamp for securing certain parts together.

Referring to the drawings (Figs. 1, 2 and 3), 1 is an axle which, in the preferred form of my invention, is of I cross section. In the form shown, the vertical web of the axle has an expanded or enlarged central portion 2 and the axle is provided near its outer ends with horizontal seats or brackets 3—3 for supporting the springs or any portion of the body of the vehicle, and with vertical brackets or supports 4 for securing parts of the gear casing hereinafter referred to, while the outer ends 5 of the axle beyond the vertical brackets, are made cylindrical in cross section. The ends of the axle are preferably formed with central openings for receiving stub axles 6, on which tread wheels 7 are mounted.

In the form shown, the vertical web portion is provided on one side with an annular shoulder 8 against which fits an annular flange or shouldered portion 9 projecting from a gear casing 10, which is provided with sleeves 11 extending longitudinally of the main axle and entering annular plates 12 mounted on the cylindrical portions 5 of the axle. The sleeves are supported from the vertical brackets 4 of the main axle by means of split clamps 13 bolted to the brackets and surrounding the sleeves and held together by bolts 14. The plates 12 are held from rotation by means of threaded bolts 20 which pass through vertical flanges 21 on the split clamps 13 and enter threaded openings in ribs or projections 22 formed on the back of the plates 12.

Each tread wheel 7 is provided with a hub 23 having an annular flange 24 to which is secured a laterally extending annular flange or drum 25 having a running joint 26 with a lateral flange 27 on the inner face of the adjacent plate 12. The lateral flanges or drums 25 are provided with internal gear wheels 28 meshing with pinions 29 carried at the outer ends of jack shafts 30 which extend from differential gearing hereinafter mentioned, in the casing 10. Each lateral flange or drum 25 forms, with the adjacent flanged hub 23 and plate 12, a casing inclosing the adjacent gear wheel 28 and pinion 29. Each tread wheel is also provided with an annular flange 31 bolted thereon and having its outer end 32 bent laterally toward the adjacent plate 12 so as to form a second lateral flange or drum extending between the wheel and the plate, and this flange or drum also has a running joint 33 with the plate 12; and with the outer portion of the plate it forms a second or outer casing around the first casing. If desired, an emergency brake band 34 may be placed within this outer casing so as to operate upon the inner surface of the drum or flange 32, and a service brake band 35 may be placed around the outer surface of the flange or drum to engage therewith. It will be noted that the gear wheel and pinion are thus protected by a double casing or, looking at it in another way, by a casing having an inner and an outer cylindrical wall. And it will be further noted that the running joints 26 and 33 are out of alinement with each other so as to avoid any possibility of a direct stream of water being forced into the inner casing as when washing off the vehicle. Any dust, fluid or foreign matter which may pass the outer running joint 33 will be caught within the outer casing and be prevented from reaching the inner gear wheel and pinion. This construction thoroughly protects the teeth of the gears adjacent the wheel from being ground out by grit and dirt, which is one of the greatest sources of annoyance in motor vehicles of this type.

The main axle is provided, on its opposite face from the casing 10, with a second annular shoulder 38, preferably concentric with an opening 39 through the vertical flange of the axle, and also concentric with the annular shoulder 8. Against the shoulder 38 fits a lateral flange 40 of a sleeve 41, in which is journaled, at 42, a driving shaft 43 which may extend directly from the engine or may be connected therewith through suitable multiple speed gearing mounted in a casing 44 preferably formed integral with the sleeve 41. The shaft 43 has mounted on its end, a bevel pinion 45 which meshes with a bevel gear 46 rigidly secured to short sleeves 47 journaled in the ends of the casing 10, as shown at 48. The gear wheel 46 is connected, through the usual form of differential gearing 49, to the respective jack shafts 30, 30 which, through the pinions 29 and gear wheels 28, drive the tread wheels 7.

It will be observed that, by providing the vertical web portion of the axle with shouldered portions, against which shouldered portions or flanges of the gear casing snugly fit, all lateral stresses and strains between the casing and the axle are taken up by these shouldered portions, which firmly hold the two from relative movement; and by suitably securing the casing to the axle, as by bolts 50, the casing is held in place against the axle, and a very stanch and rigid engagement of the axle and casing is insured. It will also be observed that when the shouldered engagement is made substantially in the manner shown, and with the sleeves 11 rigidly secured to the main axle at its outer ends, that the casing and sleeves constitute a component part of the main axle, and form therewith a rigid and substantial structure and one which may be readily assembled or disassembled. It will also be observed that when the gear casing is placed on the opposite side of the main axle from the drive shaft 43, and the shouldered portions on the opposite faces of the web are formed concentric, that the driving shafts may be readily alined and the proper meshing of the bevel gears insured, simply by slipping the shoulders or flanges 9 and 38 of the casing and the sleeve 41 into engagement with the respective annular shoulders on the opposite faces of the vertical web. It will be further observed that the vertical flange of the axle forms a part of the wall of the casing 10, and that all parts of the driving mechanism are held firmly in alinement and are thoroughly protected from grit or dust.

While I have shown and described my invention in what I now believe to be its best form, it will be obvious to those skilled in the art that certain features of the invention may be used independently of other features shown and described, and that various modifications in the arrangement and construction of the parts may be used, without departing from the spirit or scope of my invention, and I do not wish to be understood as limiting myself other than as set forth in the appended claims.

Having thus described my invention, what I claim as new and desire to secure by Letters Patent, is:

1. In a motor vehicle, the combination of an axle having a vertical web portion, a gear-casing on one side of the vertical plane of the axle and having a flange portion rigidly secured to the lateral face of the web portion of the axle, sleeves extending from the casing on either side thereof along the axle toward the wheels, and means rigidly securing the sleeves to the axle.

2. In a motor vehicle, the combination of an axle, a gear casing on one side of the vertical plane of the axle and having shouldered engagement with the side thereof to hold the casing rigidly from lateral movement with respect thereto, sleeves extending from said casing and running longitudinally of the axle, and means rigidly securing the sleeves to the axle.

3. In a motor vehicle, the combination of an axle having a vertical web portion, a gear-casing on one side of the axle having a flange portion engaging the web portion of said axle, said engaging portions fitting one within the other, means for rigidly holding said engaging portions together, sleeves extending from either side of the casing longitudinally of the axle, and means rigidly securing the sleeves to the axle.

4. In a motor vehicle, the combination of an axle having a vertical web portion, a gear-casing on one side thereof rigidly secured thereto, said web portion having a transverse opening therethrough, and a transmission shaft extending from the opposite side of the axle through said opening and into the casing.

5. In a motor vehicle, the combination of an axle, a gear-casing on one side thereof and rigidly secured thereto, transmission gearing in said casing, a shaft extending transversely of the axle and into said casing and geared with said gearing, and a member rigidly secured to said axle at the opposite side thereof from the casing and provided with a bearing in which said shaft is journaled.

6. In a motor vehicle, the combination of an axle having a vertical web portion, a gear casing on one side of the axle having an annular flange portion engaging the web portion of said axle, said engaging portions fitting one within the other, means rigidly holding said engaging portions together, a member on the opposite side of the axle from the casing provided with an annular shoulder of less diameter than the flange of the casing and having shouldered engagement with the web portion of the axle, means for securing said member rigidly to the axle, a transmission shaft journaled in said member and extending through the axle to the casing, and gearing in the casing geared to said shaft.

7. In a motor vehicle, the combination of an axle having a vertical web portion with an opening therethrough, a gear-casing on one side of said axle having a flange engaging said web, means for rigidly securing said casing to the axle, a member rigidly secured to the web on the opposite side thereof from the casing, and a transmission shaft journaled in said member and passing through said opening in the axle to the casing.

8. In a motor vehicle, the combination of an axle having an enlarged vertical web portion, a gear casing on one side of the axle provided with an annular flange having shouldered engagement with said enlarged web portion of the axle to hold the casing rigidly from lateral movement with respect to the axle, sleeves extending from each side of the casing longitudinally of the axle, and means rigidly securing said sleeves to the axle.

9. In a motor vehicle, the combination of an axle, a gear casing on one side of the axle having shouldered engagement therewith to hold the casing rigidly from lateral movement with respect thereto, sleeves extending from either side of the casing and running longitudinally of the axle, casing plates mounted on the ends of the axle concentric therewith and having openings for receiving said sleeves, and means for rigidly securing said plates to the axle.

10. In a motor vehicle, the combination of an axle having an enlarged vertical web portion provided with a transverse opening therethrough and also provided on one side with an annular shoulder concentric with said opening, and on the other side with an annular shoulder of less diameter than the first shoulder and also concentric with the opening, a gear casing on one side of the axle having a lateral annular flange engaging one of said shoulders, a sleeve on the opposite side of said axle having a flange engaging the other shoulder on the opposite side of the axle from the casing, means rigidly securing said flanges to the axle, a transmission shaft journaled in the sleeve and passing through the opening in the axle to the casing, and gearing in the casing geared to said shaft, whereby the shaft and gearing may be readily alined and firmly held in alinement without strain on the casing.

11. A motor vehicle axle of I cross section having an expanded web portion with a transverse opening therethrough for a drive shaft and having around said opening concentric shoulders, of different diameters, formed on each face of the expanded portion, for supporting, respectively, a gear casing and the driving shaft.

12. A motor vehicle axle of I cross section provided with horizontal and vertical supporting flanges adjacent each end thereof, the web having an expanded portion intermediate said flanges with an annular shoulder formed therein for receiving a gear casing, the ends of the axle beyond the flanges being cylindrical in cross section and adapted to receive casing plates and tread wheels.

13. In a motor vehicle, the combination of an axle of I cross section with a transverse opening through the web thereof, a gear casing on one side of said axle having a flange engaging the web of the axle, means for rigidly securing said casing to the axle, a member rigidly secured to the web on the opposite side thereof from the casing, and a transmission shaft journaled in said member and passing through said opening in the web to the casing.

14. In a motor vehicle, the combination of an axle having an expanded web portion, a gear casing on one side of the axle provided with an annular flange having shouldered engagement with said expanded web portion of the axle to hold the casing rigidly from lateral movement with respect to the axle, casing plates mounted on the ends of the axle, sleeves extending from either side of the casing longitudinally of the axle and supported in said plates, and means for rigidly securing said plates to the axle.

15. In a motor vehicle, the combination of a gear casing, and an axle at one side of the casing having a vertical web portion to which the casing is secured and, forming a part of the wall of said casing and provided with an opening therethrough for receiving a transmission shaft to the casing.

16. In a motor vehicle, the combination of an axle having an enlarged vertical web portion, a gear casing on one side of the axle provided with an annular flange having shouldered engagement with said enlarged web portion of the axle to hold the casing rigidly from lateral movement with respect to the axle, means for rigidly holding said casing to the axle, a sleeve on the opposite side of the axle from the casing and having shouldered engagement with the enlarged web portion of the axle, said enlarged web portion of the axle having an opening in alinement with said sleeve, a shaft extending through the sleeve and through said opening into the casing, and gearing in the casing geared to said shaft.

17. In a motor vehicle, the combination of an axle having an enlarged vertical web portion provided with a transverse opening therethrough and also provided on one side with an annular shoulder, a gear casing having an annular flange engaging said shoulder on the axle, a sleeve secured to the axle on the opposite side thereof from the casing and in alinement with the opening through the axle, gearing in said casing, and a shaft passing through the sleeve and geared to said gearing in the casing.

18. In a motor vehicle, the combination of an axle having an enlarged vertical web portion, a gear casing on one side of the axle provided with an annular flange having shouldered engagement with said enlarged web portion of the axle to hold the casing rigidly from lateral movement with respect to the axle, sleeves extending from each end of the casing longitudinally of the axle, a flange on the axle adjacent each end thereof, and split clamps surrounding said sleeves and rigidly secured to said flange.

19. In a motor vehicle, the combination of an axle of I cross section having an expanded web portion, a gear casing secured to the axle at the expanded web portion, sleeves extending from the gear casing longitudinally of the axle, an annular plate mounted on each end of the axle, the plates being provided with openings in which the outer ends of the sleeves enter, vertical brackets adjacent the plates, and means for securing the sleeves to said brackets.

20. In a motor vehicle, the combination of an axle of I cross section having an expanded web portion, a gear casing secured to the axle at the expanded web portion, sleeves extending from the gear casing longitudinally of the axle, an annular plate mounted on each end of the axle, the plates being provided with openings in which the outer ends of the sleeves enter, vertical brackets adjacent the plates, means for securing the sleeves to said brackets, tread wheels on the ends of the axle, transmission gearing in the casing, jack shafts geared to said gearing and extending through the sleeves to the wheels, and pinions on the outer ends of the shafts geared to the wheels.

21. In a motor vehicle, the combination of an axle having an expanded web portion with a shoulder formed thereon, a gear casing at one side of the axle having a lateral flange engaging the shoulder and secured to the axle at the expanded web portion, sleeves extending from the gear casing longitudinally of the axle, an annular plate mounted on each end of the axle, the plates being provided with openings for receiving the outer ends of the sleeves, means for rigidly securing the plates to the axle, tread wheels on the ends of the axle, transmission gearing in the casing, jack shafts geared to said gearing and extending through the sleeves and plates to the wheels, pinions on the outer ends of the shafts geared to the wheels, and means at each end of the axle including a lateral flange extending between the adjacent plate and the wheel and connected to one and having a running joint with the other and forming therewith a casing inclosing the adjacent pinion.

22. In a motor vehicle, the combination of an axle, a tread wheel at the outer end of the axle having a flanged hub, a plate mounted concentric with the tread wheel and provided with a transverse opening, a gear wheel secured to said tread wheel, a jack shaft passing through the opening in the plate and having a pinion on its outer end geared to said gear wheel, a lateral annular flange extending between the plate and the hub-flange and secured to one and having a running joint with the other to form therewith a gear casing inclosing said pinion and gear wheel, and a second lateral annular flange extending between the wheel and plate and secured to one and having a running joint with the other to form therewith a second casing surrounding the first.

23. In a motor vehicle, the combination of an axle, a tread wheel at the outer end of the axle, said wheel having a flanged hub, a lateral annular flange secured to the hub-flange, an internal gear wheel carried by said flange, a plate mounted concentric with the tread wheel and provided with a transverse opening, a sleeve secured to the axle and extending into said opening, a jack shaft in said sleeve passing through the opening, a pinion on the outer end of the shaft meshing with the gear wheel, a lateral flange on the plate having a running joint with the flange supporting the internal gear wheel to form with said last flange and the hub and plate an inclosed gear casing surrounding said pinion and gear wheel, a second flange on the tread wheel extending from the hub-flange and having a lateral annular extension extending between the wheel and the plate, and a second flange on the plate having a running joint therewith, whereby a second cylindrical inclosed casing is formed around the first casing.

24. In a motor vehicle, the combination of an axle, a tread wheel at the outer end of the axle, said wheel having a flanged hub, a lateral annular flange secured to the hub-flange, an internal gear wheel carried by said flange, a plate mounted concentric with the tread wheel and provided with a transverse opening, a jack shaft passing through the opening in the plate, a pinion on the outer end of the shaft meshing with the gear wheel, a lateral flange on the plate having a running joint with the flange supporting the internal gear wheel to form with said last flange and the hub-flange and plate an inclosed gear casing surrounding said pinion and gear wheel, a second flange on the tread wheel extending from the hub-flange and having a lateral annular extension extending between the wheel and the plate, and a second flange on the plate having a running joint therewith out of alinement with said first running joint, whereby a second cylindrical inclosed casing is formed around the first casing.

25. In a motor vehicle, the combination of an axle having an enlarged vertical web portion, a gear casing on one side of the axle provided with an annular flange having shouldered engagement with said enlarged web portion of the axle to hold the casing rigidly from lateral movement with respect to the axle, a tread wheel supporting the end of said axle, a plate mounted at the outer end of the axle adjacent the tread wheel and having a transverse opening therein, a jack shaft extending from the gear casing into said opening, a pinion on the end of said shaft, and gearing connecting said pinion with the tread wheel.

26. In a motor vehicle, the combination of an axle having an enlarged vertical web portion, a gear casing on one side of the axle provided with an annular flange having shouldered engagement with said enlarged web portion of the axle to hold the casing rigidly from lateral movement with respect to the axle, a tread wheel supporting the end of the axle, a plate mounted at the outer end of the axle adjacent the tread wheel and having a transverse opening therein, a sleeve extending from the gear casing longitudinally of the axle and entering the opening in the plate, a jack shaft extending from the casing through said sleeve, a pinion on the end of the shaft, gearing connecting said pinion to the tread wheel, and means operatively related to said plate to form therewith a casing inclosing said pinion and gear wheel.

27. In a motor vehicle, the combination of an axle of I cross section having an expanded web portion, a gear casing secured to the axle at the expanded web portion, a tread wheel mounted on the end of the axle, an annular plate mounted on the axle adjacent the tread wheel and having a transverse opening therein, a sleeve extending from the casing longitudinally of the axle and entering said opening, a shaft passing through said sleeve and opening, a pinion on the end of said shaft, gearing connecting the said pinion with the tread wheel, and means intermediate the casing and the plate for securing the sleeve to the axle.

28. In a motor vehicle, the combination of an axle of I cross section having an expanded web portion, a gear casing secured to the axle at the expanded web portion, a tread wheel at the outer end of the axle, an annular plate mounted adjacent the tread wheel and concentric therewith and having a transverse opening therein, a jack shaft extending from the casing and entering said opening in the plate, a pinion on the end of the jack shaft, gearing connecting said pinion and tread wheel, and means operatively related to said plate to form therewith a casing inclosing said pinion and gearing.

29. In a motor vehicle, the combination of an axle of I cross section having an expanded web portion, a gear casing secured to the axle at the expanded web portion, a tread wheel at the outer end of the axle, an annular plate mounted adjacent the tread wheel and concentric therewith and having a transverse opening therein, means for rigidly securing said plate to the axle, a jack shaft extending from the casing and entering said opening in the plate, a pinion on the end of the jack shaft, gearing connecting said pinion and tread wheel, and means including two lateral annular flanges extending between the tread wheel and the plate to form therewith a casing with inner and outer cylindrical walls inclosing said pinion and gearing.

30. In a motor vehicle, the combination of an axle of I cross section having an expanded web portion, a gear casing secured to the axle at the expanded web portion, tread wheels on the ends of the axle, a plate mounted adjacent each of said tread wheels and concentric therewith and each having a transverse opening therein, transmission gearing in the casing, jack shafts geared to said gearing and extending through the openings in the plates, pinions on the outer ends of the shafts, gearing connecting said pinions with the tread wheels, and means including lateral annular flanges operatively related to each of said plates and forming therewith casings inclosing said pinions and connected gearing.

In testimony whereof, I have signed my name to this specification, in the presence of two subscribing witnesses.

VIGGO V. TORBENSEN.

Witnesses:
SAMUEL M. WARD, Jr.,
EDWIN SEGER.